US012666219B2

(12) United States Patent
Fernandez Franco

(10) Patent No.: US 12,666,219 B2
(45) Date of Patent: Jun. 23, 2026

(54) GENERATING SPATIAL AUDIO USING REAL-TIME USER MOVEMENT

(71) Applicant: HARMAN INTERNATIONAL INDUSTRIES, INCORPORATED, Stamford, CT (US)

(72) Inventor: Alfredo Fernandez Franco, Los Angeles, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 180 days.

(21) Appl. No.: 18/518,899

(22) Filed: Nov. 24, 2023

(65) Prior Publication Data

US 2025/0175759 A1     May 29, 2025

(51) Int. Cl.
H04S 7/00 (2006.01)
G06F 3/01 (2006.01)

(52) U.S. Cl.
CPC .............. H04S 7/304 (2013.01); G06F 3/012 (2013.01); H04S 2420/01 (2013.01)

(58) Field of Classification Search
CPC ...... H04S 7/304; H04S 2420/01; G06F 3/012; G06F 3/017
USPC ........................................................ 381/310
See application file for complete search history.

(56) References Cited

U.S. PATENT DOCUMENTS

| | | | |
|---|---|---|---|
| 10,015,620 B2 | 7/2018 | Dillen et al. | |
| 11,644,894 B1 | 5/2023 | Brimijoin, II et al. | |
| 2018/0220253 A1 | 8/2018 | Kärkkäinen et al. | |
| 2019/0278802 A1 | 9/2019 | Casimiro Ericsson et al. | |
| 2021/0358470 A1 | 11/2021 | Kremmerer et al. | |
| 2022/0279303 A1 | 9/2022 | Marculescu et al. | |
| 2022/0329965 A1* | 10/2022 | Vanne ...................... | H04R 5/04 |

FOREIGN PATENT DOCUMENTS

| | | |
|---|---|---|
| WO | 2022123108 A1 | 6/2022 |
| WO | 2022151336 A1 | 7/2022 |

* cited by examiner

*Primary Examiner* — Paul Kim
(74) *Attorney, Agent, or Firm* — Artegis Law Group, LLP

(57) ABSTRACT

Techniques for generating spatial audio using real-time user movement include receiving sensor data from one or more sensors of a head-worn audio device, the sensor data corresponding to combined head and body movements of a user; extracting head movements from the combined head and body movements; generating one or more spatial filters based on the head movements; processing an audio signal using the one or more spatial filters to generate one or more filtered audio signals; and outputting the one or more filtered audio signals using one or more loudspeakers.

20 Claims, 5 Drawing Sheets

100

500

GENERATING SPATIAL AUDIO USING REAL-TIME USER MOVEMENT

BACKGROUND

Field of the Various Embodiments

The embodiments of the present disclosure relate generally to audio engineering and, more specifically, to generating spatial audio using real-time user movement.

Description of the Related Art

Since the early days of audio engineering, there has been a desire to harness and replicate sound in a manner that replicates the genuine auditory environments humans experience daily. This interest has led the industry from the basic monophonic sounds, reminiscent of old radios, to the intricate stereo systems that added depth and directionality to sound, and more recently to 3D spatial audio. Instead of just transmitting sounds, 3D spatial audio reconstructs a three-dimensional auditory environment. 3D audio creates immersive soundscapes where sounds are not just left or right, but can come from above, below, or any intermediate point, around the listener. The goal of 3D spatial audio is to immerse listeners into the reproduced environment so that the listeners feel physically present, whether it is amidst a serene forest with birds chirping overhead, a bustling city street, or the suspense-filled climax of a movie.

One feature of human hearing includes the ability to pinpoint the source of sounds. Two ears, placed strategically on either side of the head, work in tandem to capture the variations in the sound waves, be it in terms of timing, pitch, or loudness. This mechanism enables listeners to identify whether a sound is coming from behind, ahead, or from some other direction. Thus, knowing a listener's head orientation is important when generating 3D spatial audio. Simple activities, like nodding in agreement or turning to face someone, can alter the auditory landscape as perceived by the listener. A whisper that seemed to originate from directly in front of a listener can suddenly shift to one side when the listener turns his or her head. Thus, for audio systems to generate 3D spatial audio, the audio systems should adapt to the movements of the listener.

Conventional audio technologies face notable challenges. A predominant drawback is the differentiation between combined movements of the head and movements of the body and movements of the head. For instance, when a user nods in agreement while walking, motion sensors can inaccurately interpret this as a forward-leaning motion. Such sensors commonly detect both movements concurrently, making it a difficult task to separate the subtle head nods from the overarching forward motion. This distinction is important, because even minor errors in detecting head orientation can interfere with the quality of the 3D auditory illusion, causing dissonance between perceived and actual sound directions.

Yet another drawback is that many current 3D audio systems rely on pre-determined audio landscapes. While these soundscapes are often crafted with precision, these soundscapes often fail to accommodate the unpredictable nature of the listener's movement in real-time. For example, in a virtual forest setting where the rustling of leaves is preset to originate from the left of the listener, if the listener were to sprint or spin, the 3D audio system can lag in adjusting the sound direction. As a result, despite the change in the listener's orientation or position, the rustling continues to sound as though the rustling originates from the left of the listener. This sluggish response can make the environment feel artificial and stagnant, rather than dynamic and responsive, reducing the quality of the 3D spatial audio experienced by the listener.

As the foregoing illustrates, what is needed in the art are more effective techniques for adjusting 3D spatial audio based on the movements of a listener.

SUMMARY

In various embodiments, a computer-implemented method for generating spatial audio includes receiving sensor data from one or more sensors of a head-worn audio device, the sensor data corresponding to combined head and body movements of a user; extracting head movements from the combined head and body movements; generating one or more spatial filters based on the head movements; processing an audio signal using the one or more spatial filters to generate one or more filtered audio signals; and outputting the one or more filtered audio signals using one or more loudspeakers.

Further embodiments provide, among other things, non-transitory computer-readable storage media storing instructions for implementing the method set forth above, as well as a system configured to implement the method set forth above.

At least one technical advantage of the disclosed techniques relative to the prior art is that, with the disclosed techniques, the head movements of a user are determined using head-mounted sensors without using body-worn sensors. In addition, the elimination of the body-worn sensors provides for a simpler audio system that does not require that a user place additional sensors at one or more locations on the user's body and instead can utilize sensors deployed in a head-mounted audio device. Another technical advantage of the disclosed techniques is that the disclosed techniques generate a better spatial audio experience for the user over prior art techniques that consider combined head and body movements based on head-mounted sensors without removing the effects of body movements. Further, the disclosed techniques provide a computationally efficient approach for generating spatial audio that provides real-time adaptation to the head movements of the user, which improves the audio experience of the user. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
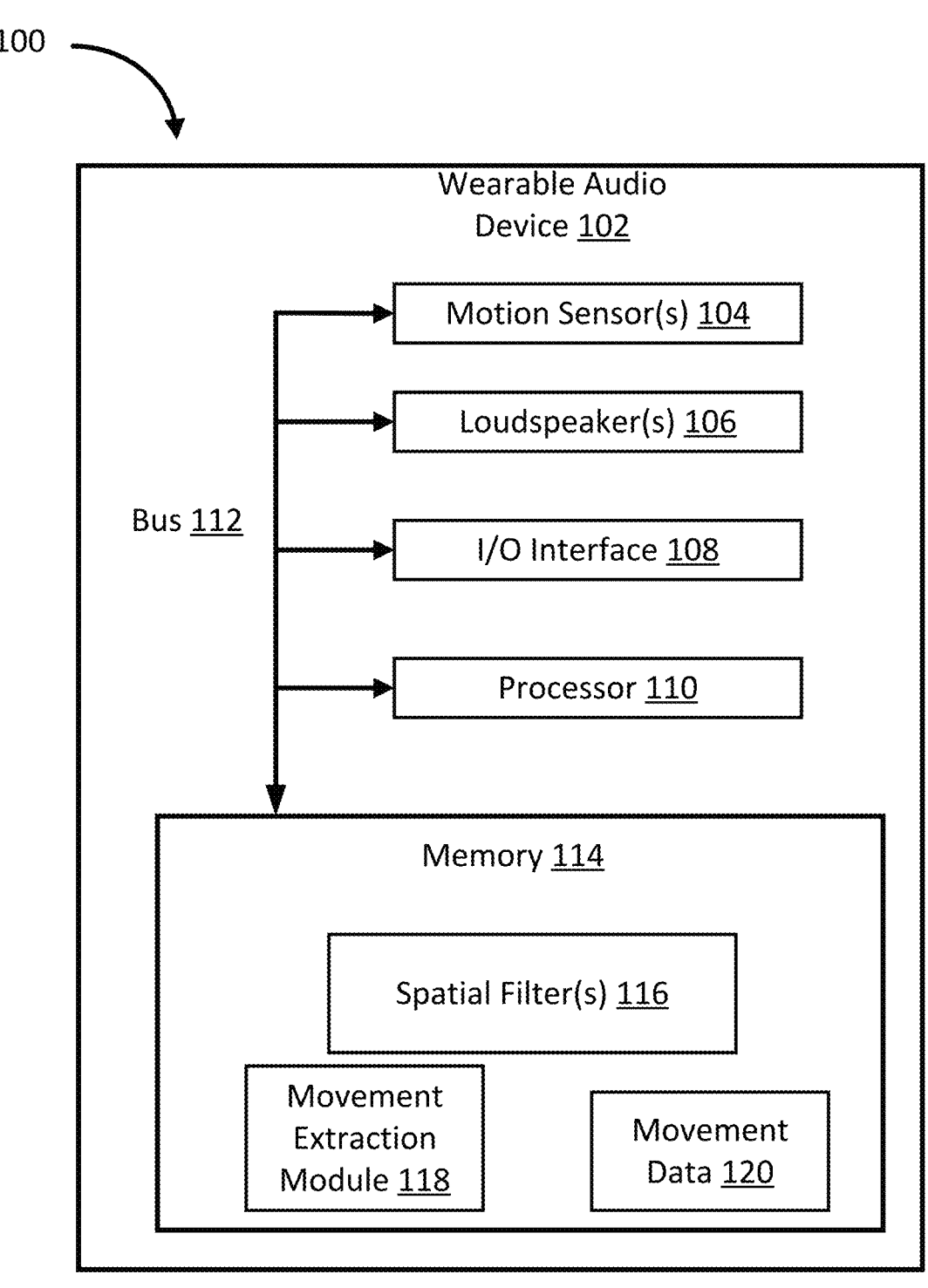
FIG. 1 is a block diagram of a 3D audio system configured to implement one or more aspects of the present disclosure.

FIG. 1 is a conceptual block diagram of a 3D audio system 100 configured to implement one or more aspects of the present disclosure. As shown, and without limitation, the 3D audio system 100 includes a wearable audio device 102, for example, a VR headset or a headphone. The wearable audio device 102 includes, without limitation, one or more motion sensor(s) 104, one or more loudspeaker(s) 106, an I/O interface 108, a processor 110, a bus 112, and a memory 114. The memory 114 includes, without limitation, one or more spatial filter(s) 116, a movement extraction module 118, and movement data 120. The 3D audio system 100 can include multiple instances of elements, even when not shown, and still be within the scope of the disclosed embodiments.

In various embodiments, the wearable audio device 102 is designed to facilitate a 3D audio experience that dynamically adapts to the head movements of the user (e.g., a listener) in real-time. The wearable audio device 102 comprises components such as motion sensor(s) 104, loudspeaker(s) 106, and a processor 110, among others, which collaboratively work together to produce an adaptive 3D audio output. The motion sensor(s) 104 capture the head and body movements of the user, processing this movement information to influence the auditory output, ensuring that the physical orientation of the user is accounted for when generating the audio experience. For example, in virtual reality applications, the wearable audio device 102 can utilize the movement data to enhance the realism of the auditory environment, adjusting the sound direction and intensity to match the user head orientation and position. Additionally, in gaming scenarios, wearable audio device 102 can use the motion sensor(s) 104 to create a soundstage that corresponds with the in-game environment, ensuring that the audio cues are accurately portrayed based on the user's actions and focus within the game.

The wearable audio device 102 employs techniques that facilitate the accurate mapping and positioning of sound sources within the user's auditory environment. The techniques include the calculation of spatial parameters such as angles and/or distances relative to the user's position, enabling the device to modify the audio output based on the user movements and spatial orientation within the environment. This orientation allows for a rich and immersive audio experience that is both spatially relevant and dynamically responsive to the user's movements.

In operation, the wearable audio device 102 uses one or more motion sensor(s) 104 to continuously monitor the combined body and head movements of a user. The combined body and head movements of the user are stored in the movement data 120. The movement extraction module 118 processes the combined head and body movements of the user in the movement data 102 and extracts the head movement of the user. The extracted head movement of the user is used to generate one or more spatial filter(s) 116 that are used to process audio inputs to account for the head movement. Audio input (e.g., music or other spatial sound) is then filtered using the spatial filter(s) 116 to enhance certain frequencies or attributes to better suit the spatial audio effects due to the head movement. The processed audio is then sent to the loudspeaker(s) 106 to generate 3D spatial audio.

The motion sensor(s) 104 are located in the wearable audio device 102 placed on the head of the user and detect the combined head and body movements of the user. In some embodiments, the motion sensor(s) 104 include a gyroscope, which captures the rotational movement of the wearable audio device 102 about various axes. In some embodiments, the motion sensor(s) 104 include one or more accelerometers. The one or more accelerometers measure linear acceleration in one or more directions, providing data on how the wearable audio device 102 is moving, be it horizontally or vertically. In some embodiments, the motion sensor(s) 104 include one or more magnetometers. The one or more magnetometers measure the strength and direction of magnetic fields. When used with data from other sensors like gyroscopes and accelerometers, magnetometers can assist in determining the overall orientation and direction of the wearable audio device 102 relative to a reference, such as magnetic north. In some embodiments, the motion sensor(s) 104 include multiple types of sensors and a sensor fusion hub that combines different types of sensor data to capture the motion of the wearable audio device 102. As a non-limiting example, the sensor fusion hub can combine changes detected by a three-axis accelerometer, a gyroscopic sensor, and/or a magnetometer.

The loudspeaker(s) 106 produce the audio output that is to be heard by the user. The loudspeaker(s) 106 interface with other components in the wearable audio device 102. For instance, the processor 110 processes audio signals and directs these processed signals to the loudspeaker(s) 106. In some embodiments, the loudspeaker(s) 106 include any type of loudspeaker, such as dynamic or moving-coil loudspeakers, planar magnetic loudspeakers, electrostatic loudspeakers, and/or the like.

The I/O interface 108 facilitates communication between the wearable audio device 102 and other external systems. Audio input, such as music or other spatial sounds, is stored in memory 114 and/or is received through the I/O interface 108, such as from a separate media device (not shown) or a media streaming service. The audio input is subsequently relayed to the processor 110, where the audio input undergoes processing based on the spatial filter(s) 116. The refined audio signals are then sent to the loudspeaker(s) 106, generating the spatial audio output. The I/O interface 108 can be any technically feasible type of interface, such as a Universal Serial Bus (USB) interface, a Bluetooth interface an optical audio interface, and/or the like.

The processor 110 performs various computational tasks during operation of the wearable audio device 102. The processor 110 can be any suitable processor, such as a central processing unit (CPU), a graphics processing unit (GPU), an application-specific integrated circuit (ASIC), a field programmable gate array (FPGA), a digital signal processor (DSP), a multi-core processor, and/or any other type of processing unit, or a combination of multiple processing units, such as a CPU configured to operate in conjunction with a GPU. In general, the processor 110 can be any technically feasible hardware unit capable of processing data and/or executing software applications.

The interconnect bus 112 connects the processor 110, the memory 114, the motion sensor(s) 104, and any other components of the wearable audio device 102. Bus 112 facilitates the flow of information and commands between the components of the wearable audio device 102.

Memory 114 can include diverse modules like a random-access memory (RAM) module, a flash memory unit, and other types of memory units or combinations thereof. The processor 110 within the wearable audio device 102 is set up to read from and write data to Memory 114. In various embodiments, memory 114 integrates non-volatile storage forms such as optical drives, magnetic drives, flash drives, among other storage types. In some embodiments, additional data storage options, possibly external to the wearable audio device 102, are used to complement memory 114. The memory 114 stores, without limitation, modules, such as the movement extraction module 118 and the spatial filter(s) 116, and data, such as the movement data 120. The modules are executed by the processor 110 to facilitate the functionality offered by the wearable audio device 102.

The spatial filter(s) 116 modulate and adjust audio signals. In some embodiments, the spatial filter(s) 116 include a software or algorithmic component, consisting of digital instructions and parameters that guide the processing of audio signals. The role of the spatial filter(s) 116 can include, without limitation, acting upon the audio data, applying specific transformations such as amplification, attenuation, or frequency adjustments to adjust the audio output based on the movements of the user wearing the wearable audio device 102. The spatial filter(s) 116 can include one or more digital or analog filters, designed to emphasize, attenuate, or remove specific frequency components to enhance the overall audio experience. Additionally or alternatively, the spatial filter(s) 116 can include an active filter, powered and designed to handle amplification or attenuation tasks and/or the spatial filter(s) 116 can include passive filters, which do not require external power, relying on components such as resistors, capacitors, and inductors to shape the audio signal. In various embodiments, the spatial filter(s) 116 include adaptive filters. The characteristics of adaptive filters are automatically adjusted based on the input audio signal or other external references, which allow for a dynamic audio processing capability, ensuring high quality 3D audio delivery in varying conditions.

The spatial filter(s) 116 can include a range of different types of filters, such as head-related transfer function (HRTF) filters, binaural filters, and/or the like. For instance, if the head of the user turns to the left, a head-related transfer function (HRTF) filter can be applied to create a perception of sound originating from the right, thereby maintaining the auditory illusion of a static sound source in the environment. Similarly, binaural filters could be employed to enhance the depth and spatiality of the sound by mimicking the natural way sound waves interact with the human head and ears.

The movement extraction module 118 processes the movement data captured by the motion sensor(s) 104. The movement extraction module 118 extracts the head movements of the user from the combined body and head data stored in movement data 120 and generates one or more spatial filters 116 to process audio inputs from I/O interface 108.

In some embodiments, the movement extraction module 118 uses a dynamic model for head and body movements, such as quaternions, and/or the like. The movement extraction module 118 utilizes an estimation technique, such as Kalman filtering and/or Wiener filtering, to extract body movements from noisy measurements of the movement received from the motion sensor(s) 104. The movement extraction module 118 then subtracts the body movements from the movement data 120 to extract head movements. Additionally or alternatively, the dynamic model and/or estimation technique can extract the head movements directly from the combined head and body movements without separately determining the estimated body movements.

In some embodiments, the movement extraction module 118 uses one or more machine learning models to distinguish body movements from the movement data 120 corresponding to the combined head and body movements of the user. The machine learning module can include any technically feasible machine learning model that can include one or more recursive neural network (RNNs), such as one or more, Long Short-Term Memories (LSTMs), Gated Recurrent Units (GRU), and/or the like. Other machine learning methods such as Support Vector Machines (SVM) and Decision Trees can also be used by the movement extraction module 118. Support Vector Machines, for instance, can be efficient in classifying and distinguishing between different types of movements by finding the optimal hyperplane that separates classes of data. Decision Trees could offer a hierarchical approach to decision-making, enabling a structured, step-by-step classification of movements, aiding in the differentiation between head and body movements. The machine learning model and/or combination of machine learning models to extract the body movements from the combined head and body movements. The movement extraction module 118 then subtracts the body movements from the movement data 120 to extract head movements. Additionally or alternatively, the one or more machine learning models can extract the head movements directly from the combined head and body movements without separately determining the estimated body movements.

In some embodiments, the movement extraction module 118 includes one or more calibration functions to adapt to the unique movement patterns of each user. The calibration functions allow the movement extraction module 118 to personalize the movement extraction process, improving the accuracy of distinguishing between various types of movements. By understanding the specific tendencies and patterns of a user's movements, the calibration function(s) enable the movement extraction module 118 to fine-tune the movement extraction, ensuring that the movement extraction is more closely aligned with the user's natural motions and orientations. Consequently, the calibration function(s) facilitate a more accurate adaptation of the 3D audio experience to individual users, based on the calibrated understanding of the movement patterns of the user.

The movement data 120 stored within the memory 114 maintains a record of the movements of the user captured by the motion sensor(s) 104. In some embodiments, movement data 120 includes a time series of various positional coordinates (e.g., x, y, and z) and/or rotational orientations (e.g., yaw, pitch, and/or roll) effectively recording the movements of the combined head and body of the user in three-dimensional space. For instance, when the head of a user is turned to the left or right, this action results in a change in the yaw orientation of the head. If the head of the user is nodded or lifted, this action results in a change in the pitch orientation of the head. Similarly, a tilt of the head from side to side would result in a change the roll orientation of the head. These orientations can be used in the fine-tuning process of the audio output, ensuring a sound delivery that aligns with the head movements of the user. For example, the movement data 120 can include values representing the distance and angle of the user's head relative to a certain reference point. The movement data can also be used by other components within the wearable audio device 102, including the movement extraction module 118.

Although the examples of FIG. 1 show the movement and audio processing with the wearable audio device 102, other arrangements are possible. For example, one or more portions of the processing and/or alwl of the processing can be performed using one or more computing devices separate from the wearable audio device 102. The one or more computing devices can include an external computing device coupled to the wearable audio device 102, such as a smartphone, a tablet, a laptop, and/or the like. The one or more computing devices can also be located remote from the wearable audio device 102, such as in one or servers coupled to the wearable audio device 102 via a network connection (not shown).

Spatial Filter Generation via Head Movement Extraction

Figure 2:
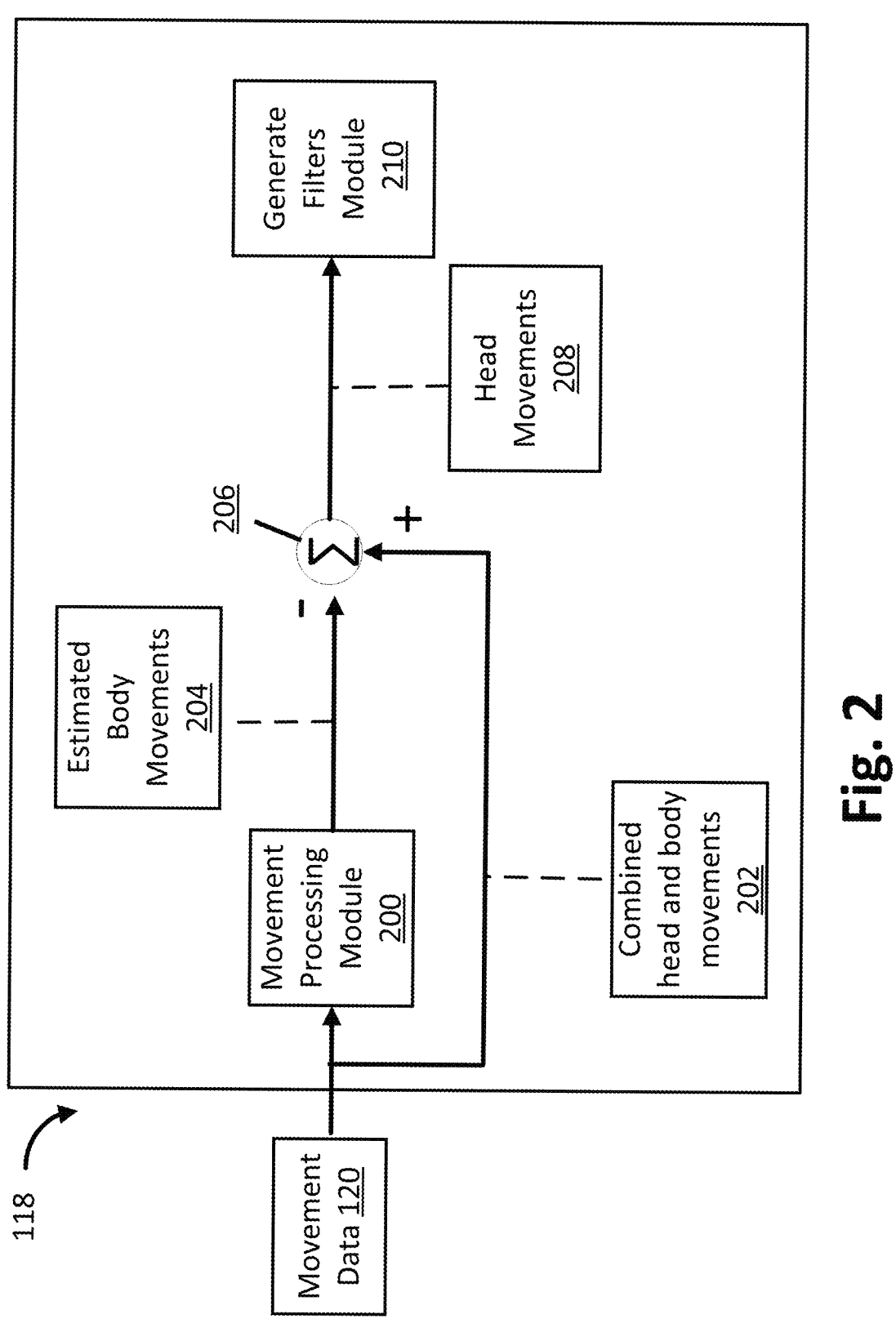
FIG. 2 is a block diagram of head movement extraction module included in the 3D audio system shown in FIG. 1 processing movement data, according to various embodiments of the present disclosure.

FIG. 2 is a block diagram of the movement extraction module 118 processing movement data 120, according to various embodiments of the present disclosure. As shown, the movement extraction module 118 includes, without limitation, a movement processing module 200, a summing junction 206, and a generate filters module 210.

The movement processing module 200 receives the combined head and body movements 202 from the movement data 120. The movement processing module 200 analyzes the combined head and body movements 202 and estimates the portion of the combined head and body movements that correspond to body movements 204.

In various embodiments, the movement processing module 200 incorporates estimation techniques to model the dynamics of head and body movements along with a representation of model uncertainty. In some examples, the estimation techniques are predefined and provided to the movement processing module 200. The estimation techniques are used by the movement processing module 200 to distinguish the more predictable body dynamics from the less predictable head movements. Because body movements are characterized by the involvement of larger muscle groups and occur over more extended periods of time, body movements present a more stable pattern that dynamic models, such as quaternions and/or the like, can capture with greater ease. These body movements also tend to manifest with lower frequency oscillations and higher amplitudes compared to the rapid and varied movements of the head, which often produce a higher frequency of data points. By utilizing estimation techniques, such as Kalman filtering, which is known to be effective in filtering out noise and extracting valuable signals, the movement processing module 200 can more readily identify and isolate the body movements.

In various embodiments, the movement processing module 200 includes a machine learning model trained, without limitation, using supervised learning based on an extensive labelled dataset of body movements. The labeled dataset can include labeled movement data associated with various activities such as walking, running, turning, dancing, stretching, and/or the like. The training process of the supervised machine learning model includes presenting a large volume of labeled combined head and body movement data to the machine learning model, where each piece of data is labeled with the correct body movement that corresponds to the combined head and body movement. Through iterative learning processes, the internal parameters of the machine learning model are adjusted to minimize errors between the body movement predictions and the actual labeled body movements. The labeled dataset allows the machine learning model (e.g., a neural network or a decision tree) to form robust recognitions patterns for extracting the body movements from the combined head and body movements. During the training, the model learns to focus on the characteristic signatures of different body movements, distinguishing them from the more variable head movements that are included in the combined head or body movements, from the body movements. The trained machine learning model can then be deployed within the movement processing module 200 to convert the combined head and body movements received from the movement data 120 and generate the estimated body movements 204.

In various embodiments, the movement processing module 200 uses a machine learning model trained, without limitation, using unsupervised or semi-supervised learning methods, which are advantageous for parsing and understanding body movement data without requiring a comprehensive labeled dataset. The unsupervised or semi-supervised learning methods discern patterns within the data autonomously, with unsupervised algorithms identifying natural groupings and semi-supervised approaches utilizing a combination of a small amount of labeled data and a larger set of unlabeled data to enhance the learning accuracy. Unsupervised or semi-supervised learning methods can detect consistent patterns of body movements, especially when the training dataset lacks comprehensive labeling. For example, algorithms, such as cluster analysis and/or the like, categorize movement types by detecting intrinsic similarities. Through the iterative nature of unsupervised or semi-supervised learning algorithms, the movement processing module 200 can adapt to the movement data, improving the ability of the machine learning model to distinguish body movements from head movements or noise within the dataset. The movement processing module 200 can then apply the patterns learned by the machine learning model to convert the combined head and body movements received from the movement data 120 and generate the estimated body movements 204.

The summing junction 206 removes the estimated body movements 204 from the combined head and body movements 202 received from the movement data 120 to output the head movements 208 included in the combined head and body movements 202. As shown, at summing junction 206 the combined head and body movements 202 are subtracted from the estimated body movements 204 to generate the extracted head movements 208.

In various embodiments, the generate filters module 210 creates the spatial filter(s) 116 based on the extracted head movements 208. The generate filters module 210 synthesizes filter parameters for constructing the spatial filter(s) 116. By analyzing the position and orientation data included in the extracted head movements 208, the generate filters module 210 computes the characteristics—such as directionality, distance, and elevation—that are then encoded into spatial filter(s) 116. In some embodiments, one or more look-up tables are used, where predefined filter settings correspond to specific head movement positions and orientations. When a particular head movement is detected, the corresponding filter settings are retrieved and applied to the audio signal. Another method includes the use of parametric equations that dynamically generate filter parameters using mathematical models of acoustic environments. These mathematical models can take the extracted head movements 208 as inputs and calculate the filter parameters to simulate how sound waves would interact with the ears at different angles, distances, and positions. Additionally, the generate filters module 210 also employ convolution with head-related impulse responses (HRIRs), which are filters derived from measurements of how sound is affected by the user's head, ears, and torso. By convolving the audio signals with the appropriate head-related impulse responses, the generate filters module 210 can generate spatial filter(s) 116 that accurately reflect the user's head movements. In various embodiments, the generate filters module 210 also uses adaptive algorithms that continually tune the filter parameters based on real-time head movement feedback, ensuring that the spatialization effects remain accurate even as the user's movements evolve over time. Furthermore, more advanced algorithms can be used to optimize filter generation, such as genetic algorithms, neural networks, and/or the like.

Figure 3:
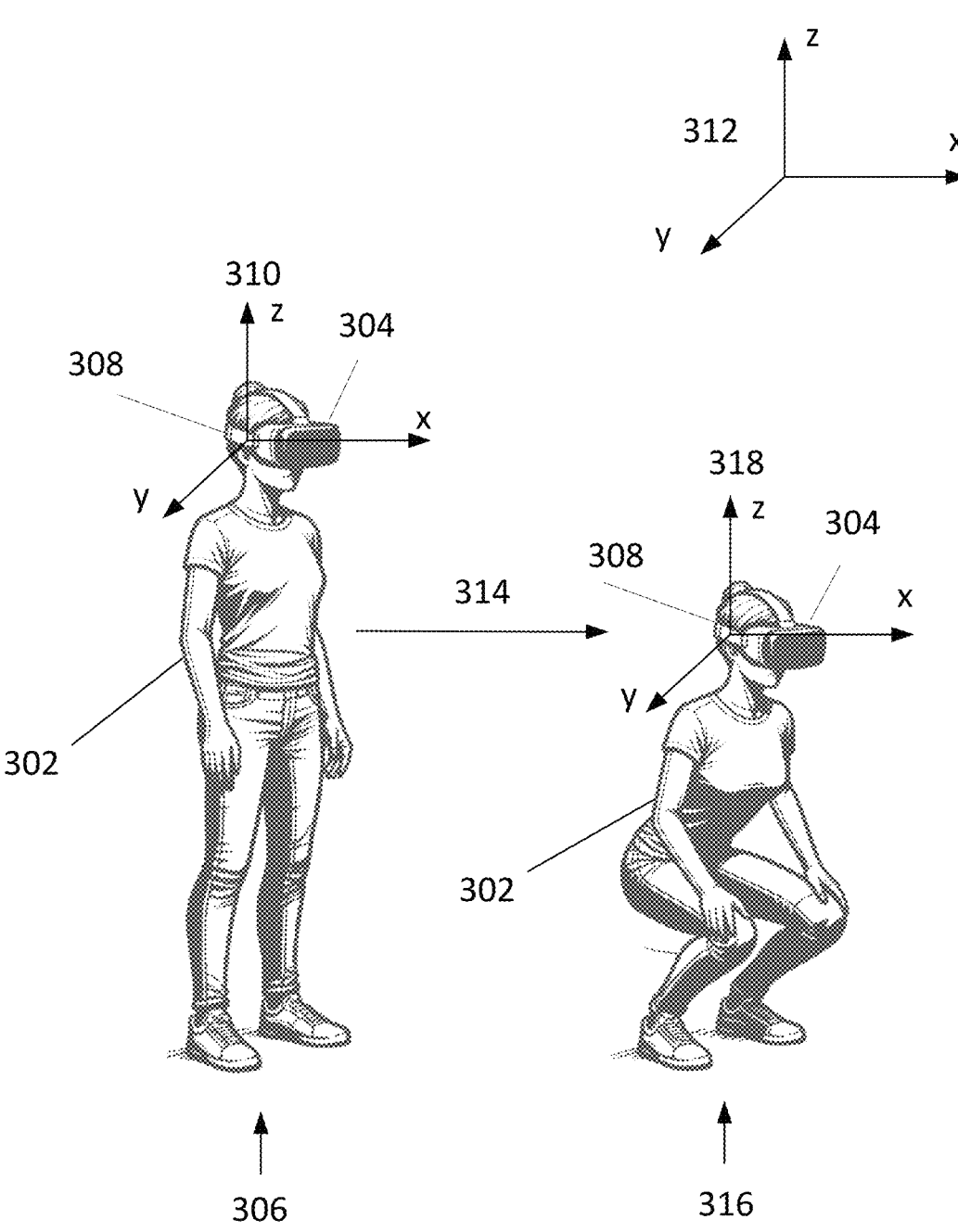
FIG. 3 illustrate an example of head and body movements of a listener that are analyzed, according to various embodiments of the present disclosure.

FIG. 3 illustrates an example of head and body movements of a user 302 that are analyzed, according to various embodiments of the present disclosure. As shown in FIG. 3, the user 302 is wearing a virtual reality headset 304. In some embodiments, the virtual reality headset 304 is an example of the wearable audio device 102, As further shown, the user 302 starts in a standing pose 306 with the position and orientation of the head 308 of the user 302 being captured in a first coordinate frame 310 of the head 308 relative to a common coordinate from 312. Following a movement 314, the user 302 has moved to a squatting pose 316. As a result of the movement 314, the position and orientation of the first coordinate frame 310 relative to the common coordinate frame 312 changes to a second coordinate frame 318. The differences between the position and orientation of the coordinate frame 310 from standing pose 306 to squatting pose 316 represent the combined head and body movements of the user 302 due to movement 314. As shown in the example of FIG. 3, despite the movement of the user 302 from standing pose 306 to squatting pose 316, the head orientation remains constant, as indicated by the lack of any change in the orientation of the first coordinate frame 310 relative to the second coordinate frame 318.

The movement extraction module 118 analyzes the movement data 120 associated with the changes from first coordinate frame 310 to the second coordinate frame 318 to extract the head movements of the user 302. The movement processing module 200 uses any of the previously discussed techniques to estimate the body movements of the user 302. The estimated body movements 204 are then subtracted from the combined head and body movements 202 at summing junction 206 to compute head movements 208. The generate filters module 210 utilizes the extracted head movements 208 to tailor the spatial filter(s) 116 to the extracted head movements 208. The spatial filter(s) 116 are designed to modify the incoming audio signal to create an auditory landscape that aligns with the orientation and position of the head 308 of the user 302.

As shown in FIG. 3, when the user 302 transitions from the standing pose 306 to the squatting pose 316, there are no changes in the orientation of the head 308. The head 308 remains in a fixed orientation relative to the common coordinate frame 312 throughout the movement 314. As a result, the spatial filter(s) 116 that have been generated based on the initial head orientation in the coordinate frame 310 do not change. The audio signals are processed by these spatial filters and subsequently sent to the loudspeaker(s) 106 maintaining the orientation of the perceived audio signal relative to the head 308 of the user 302. As a result, the auditory experience for the user 302 is preserved without alteration despite the movement of the body in movement 314.

Figure 4:
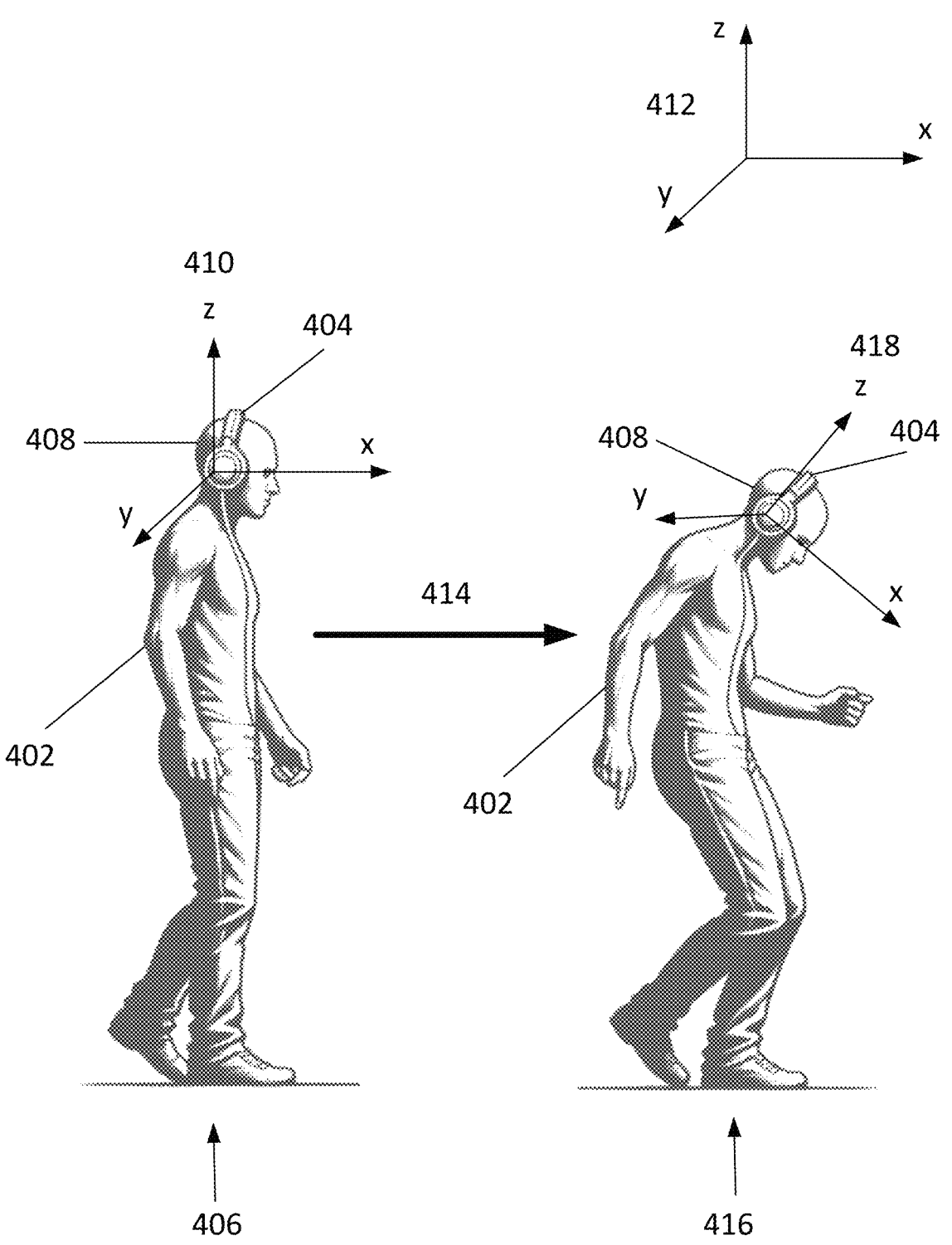
FIG. 4 illustrates another examples of head and body movements of a listener that are analyzed, according to various embodiments of the present disclosure.

FIG. 4 illustrates an example of head and body movements of a user 402 that are analyzed, according to various embodiments of the present disclosure. As shown in FIG. 4, the user 402 is wearing a set of headphones 404. In some embodiments, the set of headphones 404 is an example of the wearable audio device 102. As further shown, the user 402 starts in an upright pose 406 with the position and orientation of the head 408 of the user 402 being captured in a first coordinate frame 410 of the head 408 relative to a common coordinate from 412. Following a movement 414, the user 402 has moved to a walking pose 416. As a result of the movement 414, the position and orientation of the first coordinate frame 410 relative to the common coordinate frame 412 changes to a second coordinate frame 418. The differences between the position and orientation of the coordinate frame 410 from upright pose 406 to walking pose 416 represent the combined head and body movements of the user 402 due to movement 414. As shown in the example of FIG. 4, during the movement of the user 402 from upright pose 406 to walking pose 416, there is a discernible change in the orientation of the head 408 from the first coordinate frame 410 to the second coordinate frame 412, relative to a common coordinate frame 412.

The movement extraction module 118 analyzes the movement data 120 associated with the changes from the first coordinate frame 410 to the second coordinate frame 418 to extract the head movements of the user 402. The movement processing module 200 uses any of the previously described techniques to estimate the body movements of the user 402. The estimated body movements 204 are then subtracted from the combined head and body movements 202 at junction 206 to compute head movements 208. The generate filters module 210 utilizes the extracted head movements 208 to tailor the spatial filter(s) 116 to the extracted head movements 208. The spatial filter(s) 116 are designed to modify the incoming audio signal to create an auditory landscape that aligns with the orientation and position of the head 408 of the user 402.

As shown in FIG. 4, when the user 402 transitions from the upright pose 406 to the walking pose 416, there is a discernible change in the head's orientation from a first coordinate frame 410 to a second coordinate frame 412, relative to a common coordinate frame 412. As a result, the spatial filter(s) 116 are dynamically updated by the generate filters module 210 to account for the change in head orientation as the user 402 transitions to the walking pose 416, ensuring the audio output through the loudspeaker(s) 106 remains spatially coherent with the new orientation of the head 408, relative to the common coordinate frame 412. The audio signals are processed by these spatial filters and subsequently sent to the loudspeaker(s) 106.

Figure 5:
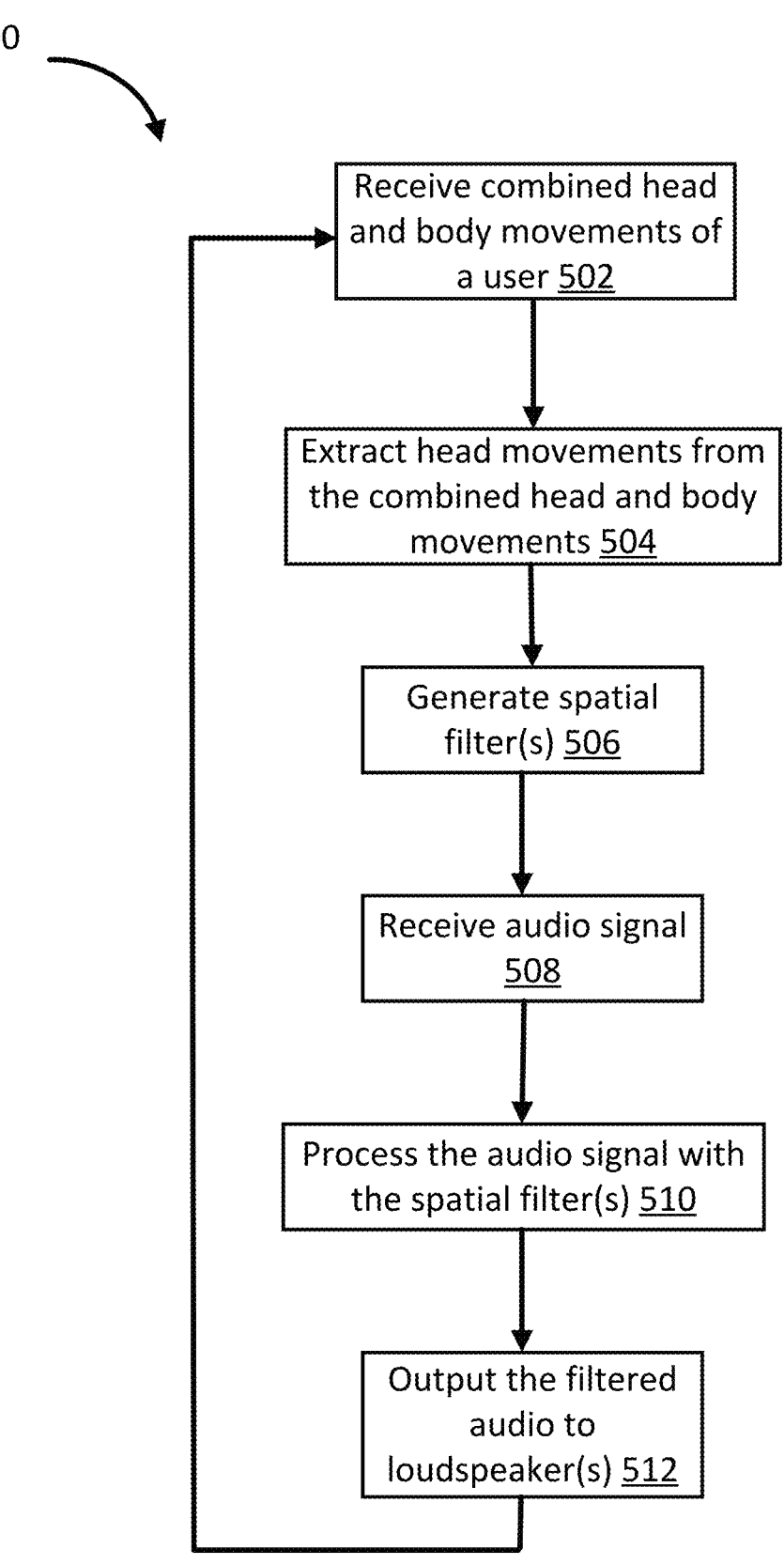
FIG. 5 outlines a flow diagram of the procedural steps for spatial audio rendering according to various embodiments of the present disclosure.

FIG. 5 is a flow diagram of method steps for extracting head movements and processing audio signals within a wearable audio device 102 to provide 3D audio experiences according to various embodiments of the present disclosure. Although the method steps are described in conjunction with the systems of FIGS. 1-4, persons skilled in the art will understand that any system configured to perform the method steps, in any order, falls within the scope of the present disclosure.

The method 500 begins at step 502, where the wearable audio device 102 receives combined head and body movements of a user. The wearable audio device 102 uses the motion sensor(s) 104 to capture the combined head and body movements 202 of the user. The motion sensor(s) capture the changes in the position and/or orientation of the head of the user due to both the body movements and the head movements of the user. For example and without limitation, the combined head and body movements can correspond to the movement 314 from the standing pose 306 to the squatting pose 316 from FIG. 3 or to the movement 414 from the upright pose 406 to the walking pose 416 from FIG. 4. The combined head and body movements 202 are stored in movement data 120 inside the memory 114 of the wearable audio device 102.

At step 504, the movement extraction module 118 extracts the head movements 208 from the combined head and body movements of the user 202. The movement extraction module 118, analyzes the movement data 120 to determine the head movements 208 from the combined head and body movement 202. In some embodiments, the movement processing module 200 uses a dynamic model and estimation algorithms to estimate body movements 204. In some embodiments, the movement processing module 200 uses a machine learning model trained based on supervised, unsupervised, semi-supervised, and/or the like, algorithms to estimate body movements 204 from the combined head and body movements 202. In some embodiments, the movement extraction module 118 further uses one or more calibration functions adapted to the unique movement patterns of the user to better determine the estimated body movements. The estimated body movements 204 are then subtracted at junction 206 from the combined head and body movements 202 to extract the head movements 208.

At step 506, the generate filters module 210 generates the spatial filter(s) 116. In some embodiments, the generate filters module 210 uses look-up tables, where preset filter settings corresponding to a particular head movement are chosen based on the head movement 208. In some embodiments, the generate filters module 210 uses parametric equations of the extracted head movements 208 to dynamically generates filter parameters based on the extracted head movements 208. In some embodiments, the generate filters module 210 uses the convolution with head-related impulse responses to generate spatial filter(s) 116 based on the extracted head movements 208. In some embodiments, the generate filters module 210 uses adaptive algorithms which use the extracted head movements 208 and correspondingly generate spatial filter(s) 116. Furthermore, the generate filters module 210 can use algorithms to optimize the generation of spatial filter(s) 116, such as genetic algorithms, neural networks, and/or the like.

At step 508, the wearable audio device 102 receives an audio signal. The audio signal can be an audio track that is pre-stored in the memory 114, which is accessed by the processor 110 thorough the bus 112. Furthermore, the audio signal can be a song or audio track on a connected media device, such as a smartphone or media player, which is transmitted to the wearable audio device 102 via the I/O interface 108. The signal is then directed through the bus 112 to the processor 110 for processing. The audio signal can also be a stream from an online service, which is received through the I/O interface 108. The data packets corresponding to the audio signal are then unpacked by the processor 110 and queued for playback. In addition, the audio signal can come from interactive applications, such as games or virtual environments, and/or the like, which is relayed to the wearable audio device 102 through the I/O interface 108.

At step 510, the wearable audio device 102 processes the audio signal with the spatial filter(s) 116. The processing with the spatial filter(s) 116 takes into account the characteristics of the audio output required for each loudspeaker(s) 106 based on the head movements 208 extracted at step 504. The spatial filter(s) 116 are applied to the audio signal for each loudspeaker, ensuring that the emitted sound interacts with the user's auditory system in a way that mimics how sound behaves in a natural three-dimensional space.

At step 512, the filtered audio is output through the loudspeaker(s) 106 of the wearable audio device 102. The loudspeaker(s) 106 convert the filtered audio signals into sound waves, which generate the spatial audio heard by the user.

After completing step 512, the method loops back to step 502 to analyze additional user movements by repeating method 500. By repeating method 500, the wearable audio device 102 adapts the playing of any audio signal to any new user movements in real-time.

In sum, the disclosed techniques accurately identify a user's head orientation from motion sensor readings of the combined head and body movements of the user using one or more sensors of a head-worn audio device. An estimated body movement of the user is determined from the combined head and body movements and then removed the combined head and body movements to determine the head movement of the user. One or more spatial filters are then generated based on the head movement. An audio signal is then filtered using the one or more spatial filters to generate corresponding filtered audio signals that are sent to one or more loudspeakers for output. The sound generated by the one or more loudspeakers based on the filtered audio signal generates spatial audio for the user that accounts for the head movements of the user.

At least one technical advantage of the disclosed techniques relative to the prior art is that, with the disclosed techniques, the head movements of a user are determined using head-mounted sensors without using body-worn sensors. In addition, the elimination of the body-worn sensors provides for a simpler audio system that does not require that a user place additional sensors at one or more locations on the user's body and instead can utilize sensors deployed in a head-mounted audio device. Another technical advantage of the disclosed techniques is that the disclosed techniques generate a better spatial audio experience for the user over prior art techniques that consider combined head and body movements based on head-mounted sensors without removing the effects of body movements. Further, the disclosed techniques provide a computationally efficient approach for generating spatial audio that provides real-time adaptation to the head movements of the user, which improves the audio experience of the user. These technical advantages provide one or more technological improvements over prior art approaches.

1. In some embodiments, a computer-implemented method for generating spatial audio comprises receiving sensor data from one or more sensors of a head-worn audio device, the sensor data corresponding to combined head and body movements of a user, extracting head movements from the combined head and body movements, generating one or more spatial filters based on the head movements, processing an audio signal using the one or more spatial filters to generate one or more filtered audio signals, and outputting the one or more filtered audio signals using one or more loudspeakers.

2. The computer-implemented method of clause 1, wherein extracting the head movements from the combined head and body movements comprises estimating body movements of the user from the combined head and body movements, and generating the head movements by subtracting the body movements from the combined head and body movements.

3. The computer-implemented method of clauses 1 or 2, where estimating the body movements comprises applying one or more estimation algorithms to the combined head and body movements.

4. The computer-implemented method of any of clauses 1-3, wherein the one or more estimation algorithms include Kalman filtering or Wiener filtering.

5. The computer-implemented method of any of clauses 1-4, where estimating the body movements comprises presenting the combined head and body movements to one or more machine learning models, wherein the one or more machine learning models output the body movements.

6. The computer-implemented method of any of clauses 1-5, wherein the one or more machine learning models are trained based on labeled movement data indicating corresponding body movements associated with corresponding combined head and body movements.

7. The computer-implemented method of any of clauses 1-6, wherein the one or more sensors include one or more accelerometers, gyroscopes, or magnetometers.

8. The computer-implemented method of any of clauses 1-7, wherein generating the one or more spatial filters comprises generating one or more head-related transfer functions or one or more binaural filters.

9. The computer-implemented method of any of clauses 1-8, wherein generating the one or more spatial filters comprises synthesizing one or more filter parameters using one or more look-up tables or one or more parametric equations.

10. The computer-implemented method of any of clauses 1-9, wherein processing the audio signal comprises convolving the audio signal with one or more head-related impulse responses included in the one or more spatial filters.

11. The computer-implemented method of any of clauses 1-10, wherein the combined head and body movements correspond to differences between a first coordinate frame associated with a head of the user prior to a movement and a second coordinate frame associated with the head of the user after the movement.

12. The computer-implemented method of any of clauses 1-11, wherein extracting the head movements from the combined head and body movements comprises applying one or more calibration functions.

13. In some embodiments, one or more non-transitory computer-readable media store instructions that, when executed by one or more processors, cause the one or more processors to perform the steps of receiving first sensor data from one or more sensors of a head-worn audio device, the first sensor data corresponding to first combined head and body movements of a user, extracting first head movements from the first combined head and body movements, generating one or more first spatial filters based on the first head movements, processing an audio signal using the one or more first spatial filters to generate one or more first filtered audio signals, and outputting the one or more first filtered audio signals using one or more loudspeakers.

14. The one or more non-transitory computer-readable media of clause 13, wherein extracting the first head movements from the first combined head and body movements comprises estimating body movements of the user from the first combined head and body movements, and generating the first head movements by subtracting the body movements from the first combined head and body movements.

15. The one or more non-transitory computer-readable media of clauses 13 or 14, where estimating the first body movements comprises applying one or more estimation algorithms to the first combined head and body movements or presenting the first combined head and body movements to one or more machine learning models, wherein the one or more machine learning models output the body movements.

16. The one or more non-transitory computer-readable media of any of clauses 13-15, wherein the one or more machine learning models are trained based on labeled movement data indicating corresponding body movements associated with corresponding combined head and body movements.

17. The one or more non-transitory computer-readable media of any of clauses 13-16, wherein generating the one or more first spatial filters comprises generating one or more head-related transfer functions or one or more binaural filters.

18. The one or more non-transitory computer-readable media of any of clauses 13-17, wherein the steps further comprise receiving second sensor data from the one or more sensors, the second sensor data corresponding to second combined head and body movements of the user, extracting second head movements from the second combined head and body movements, generating one or more second spatial filters based on the second head movements, processing the audio signal using the one or more second spatial filters to generate one or more second filtered audio signals, and outputting the one or more second filtered audio signals using the one or more loudspeakers.

19. In some embodiments, a system comprises one or more sensors, one or more loudspeakers, memory storing one or more instructions, and one or more processors that, when executing the one or more instructions, are configured to perform steps comprising receiving sensor data from the one or more sensors, the sensor data corresponding to combined head and body movements of a user, extracting head movements from the combined head and body movements, generating one or more spatial filters based on the head movements, processing an audio signal using the one or more spatial filters to generate one or more filtered audio signals, and outputting the one or more filtered audio signals using the one or more loudspeakers.

20. The system of clause 19, wherein the one or more sensors are located in an audio device worn on a head of the user.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating spatial audio, the method comprising:
   receiving sensor data from one or more sensors of a head-worn audio device, the sensor data corresponding to combined head and body movements of a user and including one or more values representing a distance and an angle of a head of the user relative to a reference point;
   extracting head movements from the combined head and body movements;
   generating one or more spatial filters based on the head movements;
   processing an audio signal using the one or more spatial filters to generate one or more filtered audio signals; and
   outputting the one or more filtered audio signals using one or more loudspeakers.

2. The computer-implemented method of claim 1, wherein extracting the head movements from the combined head and body movements comprises:
   estimating body movements of the user from the combined head and body movements; and
   generating the head movements by subtracting the body movements from the combined head and body movements.

3. The computer-implemented method of claim 2, where estimating the body movements comprises applying one or more estimation algorithms to the combined head and body movements.

4. The computer-implemented method of claim 3, wherein the one or more estimation algorithms include Kalman filtering or Wiener filtering.

5. The computer-implemented method of claim 2, where estimating the body movements comprises presenting the combined head and body movements to one or more machine learning models, wherein the one or more machine learning models output the body movements.

6. The computer-implemented method of claim 5, wherein the one or more machine learning models are trained based on labeled movement data indicating corresponding body movements associated with corresponding combined head and body movements.

7. The computer-implemented method of claim 1, wherein the one or more sensors include one or more accelerometers, gyroscopes, or magnetometers.

8. The computer-implemented method of claim 1, wherein generating the one or more spatial filters comprises generating one or more head-related transfer functions or one or more binaural filters.

9. The computer-implemented method of claim 1, wherein generating the one or more spatial filters comprises synthesizing one or more filter parameters using one or more look-up tables or one or more parametric equations.

10. The computer-implemented method of claim 1, wherein processing the audio signal comprises convolving the audio signal with one or more head-related impulse responses included in the one or more spatial filters.

11. The computer-implemented method of claim 1, wherein the combined head and body movements correspond to differences between a first coordinate frame associated with a head of the user prior to a movement and a second coordinate frame associated with the head of the user after the movement.

12. The computer-implemented method of claim 1, wherein extracting the head movements from the combined head and body movements comprises applying one or more calibration functions.

13. One or more non-transitory computer-readable media storing instructions that, when executed by one or more processors, cause the one or more processors to perform the steps of:
  receiving first sensor data from one or more sensors of a head-worn audio device, the first sensor data corresponding to first combined head and body movements of a user and including one or more values representing a distance and an angle of a head of the user relative to a reference point;
  extracting first head movements from the first combined head and body movements;
  generating one or more first spatial filters based on the first head movements;
  processing an audio signal using the one or more first spatial filters to generate one or more first filtered audio signals; and
  outputting the one or more first filtered audio signals using one or more loudspeakers.

14. The one or more non-transitory computer-readable media of claim 13, wherein extracting the first head movements from the first combined head and body movements comprises:
  estimating body movements of the user from the first combined head and body movements; and
  generating the first head movements by subtracting the body movements from the first combined head and body movements.

15. The one or more non-transitory computer-readable media of claim 14, where estimating the first body movements comprises applying one or more estimation algorithms to the first combined head and body movements or presenting the first combined head and body movements to one or more machine learning models, wherein the one or more machine learning models output the body movements.

16. The one or more non-transitory computer-readable media of claim 15, wherein the one or more machine learning models are trained based on labeled movement data indicating corresponding body movements associated with corresponding combined head and body movements.

17. The one or more non-transitory computer-readable media of claim 13, wherein generating the one or more first spatial filters comprises generating one or more head-related transfer functions or one or more binaural filters.

18. The one or more non-transitory computer-readable media of claim 13, wherein the steps further comprise:
  receiving second sensor data from the one or more sensors, the second sensor data corresponding to second combined head and body movements of the user;
  extracting second head movements from the second combined head and body movements;
  generating one or more second spatial filters based on the second head movements;
  processing the audio signal using the one or more second spatial filters to generate one or more second filtered audio signals; and
  outputting the one or more second filtered audio signals using the one or more loudspeakers.

19. A system comprising:
  one or more sensors;
  one or more loudspeakers;
  memory storing one or more instructions; and
  one or more processors that, when executing the one or more instructions, are configured to perform steps comprising:
    receiving sensor data from the one or more sensors, the sensor data corresponding to combined head and body movements of a user and including one or more values representing a distance and an angle of a head of the user relative to a reference point;
    extracting head movements from the combined head and body movements;
    generating one or more spatial filters based on the head movements;
    processing an audio signal using the one or more spatial filters to generate one or more filtered audio signals; and
    outputting the one or more filtered audio signals using the one or more loudspeakers.

20. The system of claim 19, wherein the one or more sensors are located in an audio device worn on a head of the user.

* * * * *